US008756461B1

(12) United States Patent
Jacob et al.

(10) Patent No.: US 8,756,461 B1
(45) Date of Patent: Jun. 17, 2014

(54) DYNAMIC TRACING OF THREAD EXECUTION WITHIN AN OPERATING SYSTEM KERNEL

(75) Inventors: Samuel Jacob, Bangalore (IN); Vijay Paul, Bangalore (IN); Subin Cyriac Mathew, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 396 days.

(21) Appl. No.: 13/189,186

(22) Filed: Jul. 22, 2011

(51) Int. Cl.
*G06F 11/00* (2006.01)

(52) U.S. Cl.
USPC ............................................. 714/45; 717/128

(58) Field of Classification Search
None
See application file for complete search history.

(56) References Cited

U.S. PATENT DOCUMENTS

| | | | | |
|---|---|---|---|---|
| 6,041,406 | A * | 3/2000 | Mann | 712/227 |
| 6,154,823 | A | 11/2000 | Benayon et al. | |
| 6,314,530 | B1 * | 11/2001 | Mann | 714/38.11 |
| 7,739,689 | B1 * | 6/2010 | Spertus et al. | 719/317 |
| 8,209,510 | B1 | 6/2012 | Thathapudi et al. | |
| 8,316,203 | B2 | 11/2012 | Eguchi et al. | |
| 2003/0159133 | A1 * | 8/2003 | Ferri et al. | 717/130 |
| 2004/0123274 | A1 * | 6/2004 | Inagaki et al. | 717/128 |
| 2006/0075310 | A1 * | 4/2006 | Tagawa | 714/45 |
| 2006/0143531 | A1 * | 6/2006 | Kilian et al. | 714/38 |
| 2008/0235668 | A1 * | 9/2008 | Browning et al. | 717/129 |
| 2009/0125693 | A1 | 5/2009 | Idicula et al. | |
| 2010/0251026 | A1 * | 9/2010 | Panchamukhi et al. | 714/38 |
| 2011/0126172 | A1 * | 5/2011 | Lakshminarayanachar et al. | 717/125 |
| 2011/0296133 | A1 | 12/2011 | Flynn et al. | |
| 2012/0303927 | A1 | 11/2012 | Goldberg | |
| 2013/0046951 | A1 | 2/2013 | Jones | |

FOREIGN PATENT DOCUMENTS

JP 02023434 A * 1/1990 ............. G06F 11/28

OTHER PUBLICATIONS

"Intel 64 and IA-32 Architectures Software Developer's Manual" vol. 3B: System Programming Guide, Part 2, Chapter 19, p. 3-152, Intel Corporation, Jun. 2009.

* cited by examiner

*Primary Examiner* — Gabriel Chu
(74) *Attorney, Agent, or Firm* — Shumaker & Sieffert, P.A.

(57) ABSTRACT

In general, techniques are described for providing thread-level tracing within an operating system kernel. A computing device comprising processes, an operating system and a control unit that executes the operating system may implement the techniques. Each of the processes comprises an instance of an application program. Each of the processes comprises one or more separate threads of instruction execution. The operating system concurrently executes the processes. The control unit traces execution of a system call issued to the operating system by one of the threads currently being executed by the control unit to generate a trace log that traces execution of the system call by the operating system without tracing execution of any other ones of the one or more threads corresponding to those of the plurality of processes that are also being executed by the operating system during execution of the system call.

48 Claims, 5 Drawing Sheets

DYNAMIC TRACING OF THREAD EXECUTION WITHIN AN OPERATING SYSTEM KERNEL

TECHNICAL FIELD

The techniques relate to computing devices and, more specifically, tracing of thread execution by operating systems of computing devices.

BACKGROUND

A computing device typically executes software, referred to as an "operating system," responsible for providing an interface between hardware of the computing device and application software. This operating system also generally provides common services for execution of the application software. The operating system may include a number of different components for providing the interface between the hardware and the application software, such as a kernel component, a networking component, a security component and a user interface component. The kernel component (which is often referred to as the "kernel"), may represent the core component that manages or otherwise controls the interface between application software and the hardware of the computing device. The kernel manages the execution of application software by the underlying hardware, instantiating or otherwise creating a process, allocating memory and other hardware resources for use by the process, establishing a priority for the process, loading program instructions into memory and scheduling execution of the loaded instructions associated with the process by the underlying hardware.

In executing the process, one or more of the process instructions may include what are referred to as "system calls." System calls represent instructions used to invoke or call a system service provided by the operating system for use by application programs. Via system calls, for example, the application program may access file systems presented by the operating system to the application program portion of the computing device (which is commonly referred to as "user space"), manage process execution by the underlying hardware, access network functionality, manage hardware devices, and maintain operating system information (such as time, system data, process, file or device attributes, to name a few examples). Thus, when issuing system calls, the process may interface with the kernel of the operating system to access one or more of these system services, thereby alleviating developers of application programs from having to repeatedly implement such core system services for every different type of operating environment. In effect, the operating system abstracts the underlying hardware specifics, presenting instead a standard interface by which application programs may interface with the underlying hardware without knowing the specifics of the underlying hardware.

The kernel receives these system calls and handles these system calls by providing the system service for use by the process. In some instances, the system call may fail. For certain computing devices, such as network routers, system call failures may result in these routers being unable to process routing protocol message pertinent to the forwarding of data packets through a network. Such failures may therefore impact not only the network router but the network as a whole, where other network routers have to reroute data packets around the failed network router.

System call failures may be especially troublesome for those high-end routers that provide so-called "high-availability" routing functionality. High-availability routing functionality refers to routers that each includes a primary routing engine and a backup routing engine, where the backup routing engine may seamlessly resume routing functionality in the event the primary routing engine fails, thereby providing high availability to routing functionality in the event of failure. Yet, both the primary and backup routing engines typically execute different instances of the same operating system. A failed system call that results in a failure of the primary routing engine is likely to impact the backup routing engine when the application program resumes executing on the backup routing engine. That is, upon resuming execution of the application program with the backup routing engine that issued the system call that resulted in the primary routing engine failure, the application program may re-issue this same system call that more than likely also fails on the backup routing engine (considering the backup and primary routing engines are executing different instances of the same operating system). Consequently, system call failures may be especially troublesome for those high-end routers that provide high-availability routing functionality because such system call failures may result in failures of both the primary and standby or backup routing engine.

SUMMARY

In general, techniques are described for performing dynamic thread tracing within an operating system kernel. The term "thread" refers to a thread of execution of instructions, where a so-called process may include one or more threads. Rather than trace every thread currently being executed by an operating system, as is common when attempting to enable hardware-level thread tracing, the techniques described in this disclosure may facilitate dynamic tracing of a single thread of instruction execution without tracing other threads of which the operating system may be responsible for managing execution. The techniques may enable a kernel of an operating system to enable hardware-level tracing of an individual thread during the execution of this thread by the hardware. In switching between those threads for which tracing is not enabled and those for which tracing is enabled (where such switching is commonly referred to as a "context switch), the techniques may enable the kernel to enable and disable tracing on a per-thread basis depending on whether tracing for such threads is enabled, even for threads of the same software process that share a common memory space and other resources. In this respect, not only do the techniques facilitate per-thread tracing, but also provide tracing in a dynamic manner as tracing may be enabled or disabled dynamically during execution of the threads.

The techniques may therefore promote more targeted trace logs that may permit operating system developers to more easily identify programming errors (or so-called "bugs") that result in device failures. The techniques may also provide a way to translate trace logs, which commonly specify a list of instruction addresses, to a human-readable text file, which may further facilitate developers in identifying these programming errors. By being able to potentially more quickly and accurately identify programming errors using the human-readable text file provided by the techniques described in this disclosure, the techniques may enable developers to more quickly correct these programming errors. Considering the disabling effect such system call errors may have on computing devices and, more particularly, network routers that provide high-availability routing functionality, the techniques may facilitate more timely error correction, which may increase network reliability or otherwise reduce network device downtimes.

In one embodiment, a method comprises concurrently executing a plurality of software processes by an operating system of a control unit of a network device, wherein each of the plurality of processes comprises an instance of one of a plurality of application programs, wherein each of the plurality of processes comprises one or more separate threads of instruction execution. The method further comprises tracing, with the control unit, execution of a system call issued to the operating system by one of the one or more threads corresponding to one of the plurality of processes currently being executed by the control unit to generate a trace log that traces execution of the system call by the operating system without tracing execution of any other ones of the one or more threads corresponding to those of the plurality of processes that are also being executed by the operating system during execution of the system call.

In another embodiment, a computing device comprises a plurality of processes, wherein each of the plurality of processes comprises an instance of one of a plurality of application programs, wherein each of the plurality of processes comprises one or more separate threads of instruction execution, an operating system, and a control unit that executes the operating system. The operating system concurrently executes the plurality of processes. The control unit traces execution of a system call issued to the operating system by one of the one or more threads corresponding to one of the plurality of processes currently being executed by the control unit to generate a trace log that traces execution of the system call by the operating system without tracing execution of any other ones of the one or more threads corresponding to those of the plurality of processes that are also being executed by the operating system during execution of the system call.

In another embodiment, a system comprises a network device comprising a plurality of processes, wherein each of the plurality of processes comprises an instance of one of a plurality of application programs, wherein each of the plurality of processes comprises one or more separate threads of instruction execution, an operating system, and a control unit that executes the operating system. The operating system concurrently executes the plurality of processes. The control unit traces execution of a system call issued to the operating system by one of the one or more threads corresponding to one of the plurality of processes currently being executed by the control unit of the network device to generate a trace log that traces execution of the system call by the operating system without tracing execution of any other ones of the one or more threads corresponding to those of the plurality of processes that are also being executed by the operating system during execution of the system call. The system also includes a computing device comprising a control unit that stores compilation files generated when compiling the operating system, receives the trace log, and generates a human-readable version of the trace log based on the trace log and the compilation files generated when compiling the operating system.

In another embodiment, a non-transitory computer-readable medium comprises instruction that, when executed, cause one or more processors to concurrently execute a plurality of software processes by an operating system of the one or more processors, wherein each of the plurality of processes comprises an instance of one of a plurality of application programs, wherein each of the plurality of processes comprises one or more separate threads of instruction execution and trace execution of a system call issued to the operating system by one of the one or more threads corresponding to one of the plurality of processes currently being executed by the one or more processors to generate a trace log that traces execution of the system call by the operating system without tracing execution of any other ones of the one or more threads corresponding to those of the plurality of processes that are also being executed by the operating system during execution of the system call.

In another embodiment, a method comprises concurrently executing, with an operating system of a control unit included within a computing device, a plurality of processes, wherein each of the plurality of processes comprises an instance of one of a plurality of application programs, wherein each of the plurality of processes comprises one or more separate threads of instruction execution and determining, with the operating system, that an error occurred when executing a system call issued by one of the one or more threads corresponding to one of the plurality of processes. The method further comprises, in response to the error, configuring, with the one of the threads that issued the system call, the operating system to enable tracing of the one of the threads that issued the system call without tracing any other threads corresponding to the one or any other one of the plurality of concurrently executed processes, and configuring, with the operating system, one or more registers of the control unit to enable tracing. The method also comprises, after configuring the one or more registers of the control unit to enable tracing, re-issuing the system call with the one of the one or more threads to the operating system and tracing execution of the re-issued system call by the operating system with the control unit to generate a trace log that traces execution of the system call without tracing execution of any other system calls issued by any other ones of threads corresponding to the one or any other one of the plurality of concurrently executed processes.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
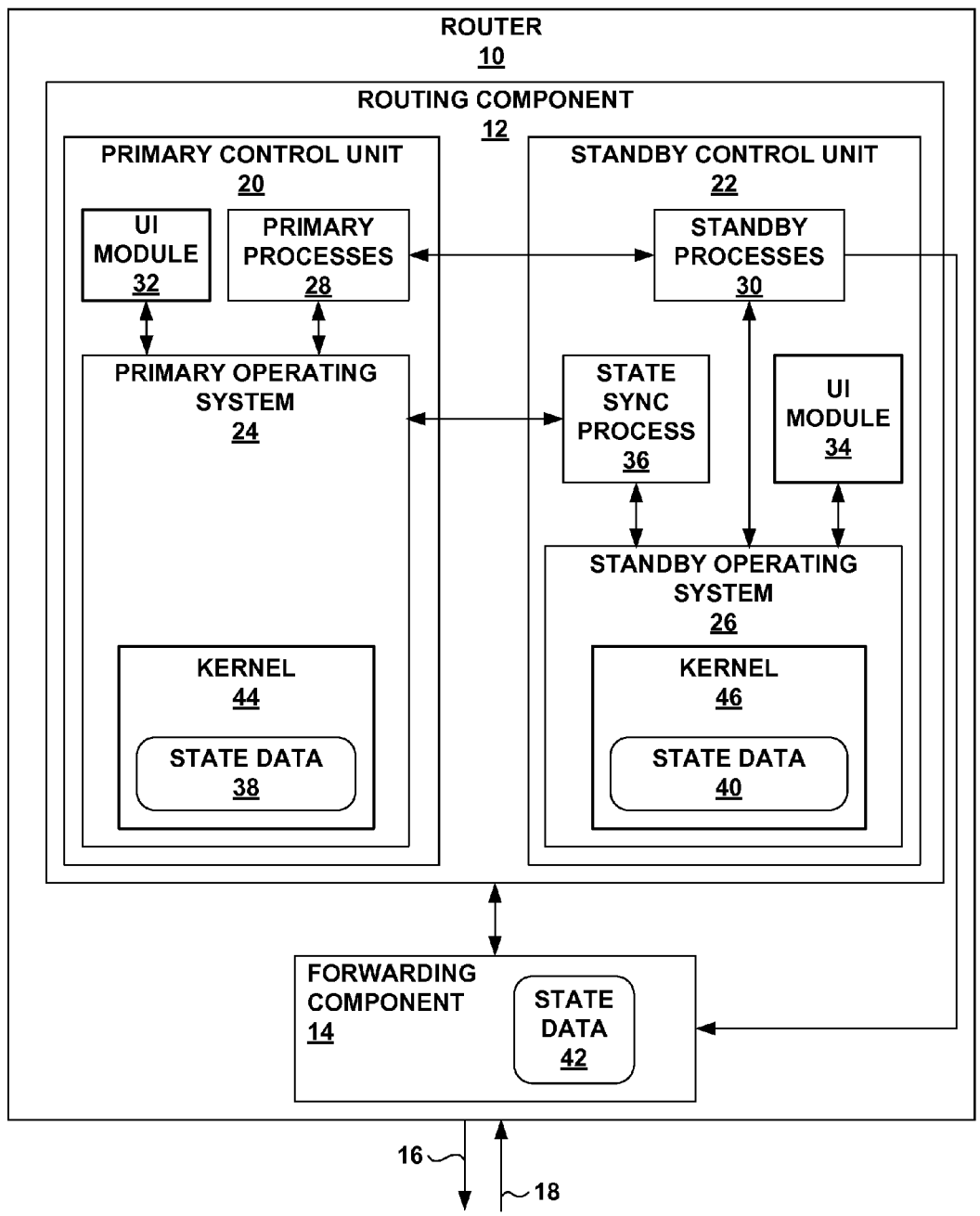
FIG. 1 is a block diagram illustrating a router that implements the operating system tracing techniques described in this disclosure.

FIG. 1 is a block diagram illustrating a router 10 as an example network device that implements the operating system tracing techniques described in this disclosure. In the example of FIG. 1, router 10 includes a routing component 12 and a forwarding component 14. Routing component 12 may represent a routing plane or control plane that controls forwarding of data packets by forwarding component 14. Typically, routing component 12 sends and receives routing protocol messages that include routing information identifying various aspects of the topology of a network in which router 10 resides. Routing component 12 may maintain this routing information in a routing information base (RIB), which it processes to generate forwarding information. Routing component 12 may maintain this routing information in the form of a graph or other data structure, and parse this graph data structure representative of the network topology to identify and select paths through the network. Routing component 12 may reduce these paths to so-called next hops that identify an interface to which packets having a particular destination are to be forwarded. Although not shown in the example of FIG. 1, routing component 12 may generate the forwarding information to specify these next hops and install the forwarding information in forwarding component 14.

Although not shown in the example of FIG. 1 for ease of illustration purposes, forwarding component 14 may receive this forwarding information and forward packets received via links 16 and 18 based on this forwarding information. While not shown in the example of FIG. 1, again for ease of illustration purposes, forwarding component 14 may include one or more interface cards that provide the physical interfaces by which links 14 and 16 couple to router 10. These interface cards may comprise cards that are inserted into a chassis. A switch fabric or other high-speed switching medium may interconnect these interface cards to facilitate the transfer of data packets from one interface card to another in accordance with the forwarding information. Forwarding component 14 may therefore represent a collection of one or more interface cards, a switch fabric, and central forwarding logic that directs packets from one interface card to another interface card in accordance with the forwarding information. In some instances, rather than provide the central forwarding logic, forwarding component 14 may provide what may be referred to as distributed forwarding logic. In the context of distributed forwarding logic, each of the interface cards of forwarding component 14 includes its own forwarding logic, generally eliminating the central forwarding logic. Often, the interface cards that include the decentralized forwarding logic are referred to as "packet forwarding engines" or "PFEs."

As further shown in the example of FIG. 1, routing component 12 includes a primary control unit 20 and a standby control unit 22, where standby control unit 22 is typically utilized to provide routing or control plane functionality only when primary control unit 20 fails. In this configuration, standby control unit 22 may represent a redundant control unit for use in instances of primary control unit 20 failure. Typically, routing component 12, upon detecting a failure of primary control unit 20 that would prevent primary control unit 20 from properly performing its control plane functionality, seamlessly (from the perspective of forwarding component 14 and other routers in the network) transfers control from primary control unit 20 to standby control unit 22, whereupon transferring control standby control unit 22 becomes the primary control unit and primary control unit 20 becomes the standby control unit. Routers that feature redundant control units capable of assuming control in the event of failure of the primary control unit are referred to as "high-availability routers" as these routers may be more resilient to error and, as a result, may provide more availability than other routers that do not feature redundant control units. Router 10 may therefore be referred to as a high-availability router 10.

Primary control unit 20 may represent one or more processors (not shown in FIG. 1) that execute software instructions, such as those used to define a software or computer program, stored to a non-transitory computer-readable medium (again, not shown in FIG. 1), such as a storage device (e.g., a disk drive, or an optical drive), or memory (such as Flash memory, random access memory or RAM) or any other type of volatile or non-volatile memory, that stores instructions to cause the one or more processors to perform the techniques described herein. Alternatively, control unit 20 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Standby control unit 22 may be substantially similar to primary control unit 20.

In the example of FIG. 1, both primary control unit 20 and standby control unit 22 execute similar software processes, such as operating systems 24, 26, processes 28, 30 and user interface (UI) modules 32, 34 ("UI modules 32"/"UI module 34"). Primary operating system 24 executing on primary control unit 20 may provide a multi-tasking operating environment for execution of a number of software processes, such as primary processes 28. Like primary operating system 24, standby operating system 26 executing on standby control unit 22 may also provide a multi-tasking operating environment for execution of a number of similar software processes, such as standby processes 30. Standby operating system 26 also provides an environment for execution of state synchronization process 36. An exemplary operating system capable of this is FreeBSD, which is an advanced UNIX operating system that is compatible with a number of programmable processors.

Primary and standby processes 32 and 34, respectively, may both include similar software processes, such as routing protocols daemons, device control daemons, user interface processes, chassis management daemons, and the like. In general, these software processes perform a number of tasks to ensure proper operation of routing component 12 of router 10. For example, routing protocols daemons may implement protocols for exchanging route information with the other routing devices, and perform route resolution to maintain routing information that reflects the topology of a network.

These processes 32, 34 may represent an instance of an application program, where each of processes 32, 34 may comprise one or more so-called "threads." The term "thread" refers to a thread of instruction execution and typically represents the smallest unit of processing that can be scheduled for execution by an operating system. Each thread typically represents a task, which refers to an execution path through an address space reserved for use by the corresponding process. The term "task" may therefore represent a set of program instructions that are loaded into memory for execution by the underlying hardware.

Both primary operating system 24 and standby operating system 26 maintain state information as state data 38 and 40, respectively. A portion of state data 38 and 40 may, for example, represent the current state of the interface between router 10 and the network, which may include the current configuration of forwarding component 12. State data 38 and 40 may comprise hierarchically-ordered and temporally-linked data structures. State data 38 and 40 may be stored in memory, such as RAM, located on respective control units 20, 22 or external to respective control units 20, 22. Forwarding component 12 may also maintain state information as state data 42. State data 42 may, for example, represent the current state of field replaceable units, such as interface cards, encryption cards, accounting service cards, and the like. Again, state data 42 may be stored in memory, such as RAM, located within or external to forwarding component 12.

At any one time, only one of primary control unit 20 and standby control unit 22 communicates with a shared router resource, e.g., forwarding component 12. For illustration purposes, primary control unit 20 maintains control of forwarding component 12. Primary operating system 24 receives event messages indicative of a change in the state of the shared resource, e.g., forwarding component 12. When primary operating system 24 receives an event message, primary operating system 24 updates state data 38 by reconfiguring the data structure and updating the data stored within the data structure. In addition to updating the data based on the change of state, primary operating system 24 may add, delete or move commit markers and/or commit proposals to various positions within the data structure in the event that the event message relates to the state of a shared routing resources, e.g., forwarding component 12.

Primary operating system 24 then replicates the state change by transmitting the state information in message form to state synchronization process 36 executing on standby control unit 22. State synchronization process 36 extracts the state information and transmits the state information to standby operating system 26. Standby operating system 26 receives this state change and updates state data 40 in accordance with the state change. In some embodiments, standby operating system 26 may support kernel-mode processes that update state data 40. Similar to primary operating system 24, standby operating system 26 may reconfigure and update the data structures of state data 40 based on the state information. Standby operating system 26 may also add, delete or move commit markers and/or commit proposals to various positions within these data structures. After being updated, state data 40 is substantially similar to state data 38. In other words, state data 40 and state data 38 are synchronized. Standby operating system 26 transmits an acknowledgement to primary operating system 24 via state synchronization process 36 to indicate this synchronized state. In this manner, state synchronization process 36 provides an interface between primary operating system 20 and standby operating system 22 that allows for the synchronization of state information.

Upon receiving the acknowledgement indicating the synchronized state, primary operating system 24 issues alert messages to various consumers indicating that the state of router 10 has changed. For example, primary operating system 24 may issue alert messages to interface cards included within forwarding component 12 to indicate a change in state data 38. In response, primary operating system 24 receives requests from the consumers for state information. Primary operating system 24 services each request by traversing the hierarchically-ordered and temporally-linked data structure of state data 38 and issuing update messages to the requesting consumer. Primary operating system 24 generates the update messages to contain state information that the consumer has not already received based on the respective commit proposal and commit marker for the consumer. Upon updating the consumer, primary operating system 24 may alter state data 38 and, more particularly, move the respective commit marker and commit proposal within the data structure of state data 38 to reflect the update.

In order for state data 38 and state data 40 to remain synchronous, primary operating system 26 again transmits state changes in message form to standby operating system 28 via state synchronization process 36. Standby operating system 28 again updates state data 40 to be substantially similar to, i.e., synchronized with, state data 38. In particular, standby operating system 28 moves the respective commit marker and commit proposal of state data 40 to mirror state data 38 and reflect that the particular consumer has been updated. Standby operating system 26 transmits another acknowledgement to primary operating system 24 via state synchronization process 36 to indicate successful synchronization of state data 40.

Synchronization of state data 38 and state data 40 continues in this manner until failover occurs. That is, synchronization occurs in this manner until primary control unit 20 fails and standby control unit 22 resumes routing functionality, whereupon synchronization proceeds from standby control unit 22 (which assumes the role of primary control unit) to primary control unit 20 (which assumes the role of standby control unit). Once failover occurs, primary control unit 20 no longer issues state change messages and standby control unit 22 assumes control over shared resources, such as forwarding component 12. If failover occurs while primary control unit 20 is updating one or more shared resources, standby operating system 26 resume updating the resources. In particular, standby operating system 26 uses the commit markers and commit proposals stored and synchronized within state data 40 to update the shared resources, e.g., forwarding component 12.

For example, standby operating system 26 traverses the hierarchically-ordered and temporally-linked data structures of state data 40 until a commit marker corresponding to forwarding component 12 is reached. Once the commit marker is reached, standby operating system 26 begins issuing state change messages to forwarding component 12. Forwarding component 12 may receive redundant state change messages if primary operating system 24 sent the same state change message but failed prior to receiving an acknowledgement from forwarding component 12. In this case, forwarding component 12 ignores the redundant state change message.

In this manner, standby control unit 22 maintains state data 40 that is synchronous with state data 38 of primary control unit 20. Therefore, standby control unit 22 may facilitate failover by assuming control without requiring standby control unit 22 to relearn the state information, e.g., by resetting forwarding component 12. Moreover, standby control unit 22 need only update the consumers with regard to a limited amount of the state information that is bounded by their respective commit markers and commit protocols encoded within the state information data structure.

To further facilitate failover, standby processes 34 may communicate with forwarding component 12 to learn state data 42 prior to failover. Standby processes 34 may then maintain current information regarding forwarding component 12 while primary control unit 20 is in control of forwarding component 12. Thus, in the event of failover, standby processes 34 are prepared to assume control without having to establish communication with forwarding component 12.

As described, in the event of failover, standby control unit 22 assumes the role of primary control unit 20. Primary control unit 20 may, after being reset, return to an operational status and assume the role of standby control unit 22. In this case, primary control unit 20 initiates a state synchronization process (not shown), similar to state synchronization process 36, to synchronize state data 38 with state data 40 in the manner described above.

Primary control unit 20 may fail for a number of reasons. For example, primary control unit 20 may experience hardware failures in memory sub-systems, hard-drives, processors or other hardware included within primary control unit 20. Such hardware failures in primary control unit 20 may require replacement of certain hardware components, temporarily removing primary control unit 20 from operation. Some hardware component failures may be overcome by re-initializing these components through a hard reset (which requires powering off and then on primary control unit 20). Alternatively, primary control unit 20 may experience software failures, where one or more of primary processes 28 become corrupted. These corrupted processes may be unable to properly perform necessary routing functions, requiring a hard reset of primary control unit 20 to re-initialize these processes 28. When performing this hard reset of primary control unit 20, standby control unit 22 may seamless assume primary routing functionality, synchronizing primary control unit 20 (which has assumed the role of standby control unit) once primary control unit 20 re-initializes primary processes 28.

Some software failures, however, may affect both primary control unit 20 and standby control unit 22, where primary control unit 20 may fail, transferring primary routing control to standby control unit 22, which then itself fails due to the same software failure. Commonly, these failures are a result of programming errors (which are commonly referred to as "bugs") in primary operating system 24, which as noted above is substantially similar to standby operating system 26. Considering that primary operating system 24 and standby operating system 26 represent instances of the same operating system, a software bug in this operating system means that both primary operating system 24 and standby operating system 26 may suffer from the same software bug. Moreover, given the synchronization between primary control unit 20 and standby control unit 22 so that standby control unit 22 maintains standby processes 30 to mirror operation of processes 28 executed by primary control unit 20, a software bug originating from executing primary processes 28 with primary control unit 20 more than likely impacts standby control unit 22.

To illustrate, assume primary operating system 24 experiences a failure in executing a system call issued from one of primary processes 28, where the phrase "system call" refers to a request by this one of processes 28 that requests one or more services provided by primary operating system 24 for use by primary processes 28. Typically, operating systems present an application programmer interface (API) that provides an interface by which primary processes 28 may interface with the various components of the operating systems. A feature of modern operating systems is a core component referred to as a "kernel" that manages interactions between process executed by the operating system and the underlying hardware on which all software executes. To gain access, for example, to memory, these processes request via a system call to read or write from the memory, issuing the system call to the kernel. Primary operating system 24 includes a kernel 44, while standby operating system 26 includes a kernel 46. Kernel 44 may be substantially similar to kernel 46, where both provide this interface between processes 28, 30 and the underlying hardware of control units 20, 22, respectively. The one of processes 28 issues this system call via the interface presented by primary operating system 24, where kernel 44 may execute the system call, experience an error in executing this system call due to a software bug, which results in failure of primary control unit 20.

Prior to the failure of primary control unit 20, primary processes 28 may synchronize their current state with standby processes 30, while primary operating system 24 may synchronize its current state with standby operating system 26 (in the form of mirroring state data 38 to state data 40 maintained by standby control unit 26). In failing over to standby control unit 22, the one of processes 30 that is synchronized with the one of processes 28 that issued the system call resulting in the failure reissues this same system call to standby operating system 26 given that this one of primary processes 28 synchronized the last instruction completed (which is the instruction before issuing the system call) to the corresponding one of standby processes 30. Kernel 46 of standby control unit 22 attempts to execute this same system call, resulting in the same error in executing this system call as kernel 44 of primary operating system 24 considering that both of kernels 44, 46 are instances of the same kernel and therefore both suffer from the same software bug that causes this error.

As a result of this error, standby control unit 22 may then failover to primary control unit 20, with the process repeating until a hard restart of router 10 is performed, which may significantly impact the network in which router 10 resides as every other router in the network may be required to select a new path through the network that does not require routing by router 10. Moreover, for routers, such as router 10, that provide high-availability routing functionality, such debilitating errors that require hard resets of router 10 in its entirety detract from the high-availability moniker assigned to these routers and potentially decrease premiums paid for such functionality in comparison to routers that do not provide so-called "high-availability" routing functionality.

While software bugs are generally assumed to be present in all software, especially such complex software as operating systems that execute on network devices, most customers that purchase high-availability routers typically assume that debilitating software bugs that require hard resets of routers in the entirety will not be present. Yet, customers also expect software updates on increasingly more frequent intervals, leaving little time for developers to ensure such bugs are removed from the operating systems. Consequently, some bugs may occur despite developers best efforts to remove these bugs. Developers may employ tools and/or utilities to discover these bugs in a test environment, but many of these tools are for debugging application programs not operating systems. Moreover, even when such debugging tools are adapted for use in debugging operating systems, these tools do not take into account the multi-tasking nature of operating systems, instead, providing a trace of the operating systems as it executes multiple threads of the one or more processes currently being executed by the operating system. The developer than must sort through the trace data of all threads currently being executed by the operating system in an attempt to identify the software bug. This all-or-nothing trace of all-or-none of the threads currently being executed by the operating system does not provide sufficient granularity to enable developers to quickly identify software bugs in operating systems.

In accordance with the techniques described in this disclosure, kernels 44, 46 may dynamically enable tracing on a per-thread basis to facilitate developer debugging of operating systems 24, 26. Rather than trace every thread currently being executed by the operating system as is common when attempting to enable hardware-level thread tracing, the techniques described in this disclosure may facilitate dynamic tracing of a single thread of instruction execution without tracing other threads of which the operating system may be responsible for managing execution. The techniques may enable kernels 44, 46 to enable hardware-level tracing of an individual thread during the execution of this thread by the hardware. In switching between those threads for which tracing is not enabled and those for which tracing is enabled (where such switching is commonly referred to as a "context switch"), the techniques may enable kernels 44, 46 to enable and disable tracing on a per-thread basis depending on whether tracing for such threads is enabled. In this respect, not only do the techniques facilitate per-thread tracing, but also provide tracing in a dynamic manner as tracing may be enabled or disabled dynamically during execution of the threads.

To illustrate, primary control unit 20 executes primary operating system 24 that supports execution of processes 28. Again, each of processes 28 represents an instance an application program. Moreover, as noted above, each of processes 28 include one or more threads that represent separate threads of instruction execution. One of these threads may issue a system call, which kernel 44 of primary operating system 24 may execute, resulting in an error due to a software bug. Kernel 44 may return this error to the one of the threads that issued the system call. This thread may handle the error by interface with kernel 44 to enable tracing, where kernel 44 may enable a hardware-level form of tracing. Some processors feature a form of hardware-level tracing, where setting one or more bits in a special reserved register of the processor may cause the processor to store the location of instructions executed by the processor until these bits are cleared. Processors that support an instruction set architecture referred to as "x86" (which are referred to as "x86 processors") may provide either a single-step debugging exception on branches (which is referred to as "BTF") trace feature or a store branch instructions addresses automatically upon branch (which is referred to as a branch trace store or "BTS") trace feature. Kernel 44 may configure processors of primary control unit 20 to enable either BTF or BTS, where part of configuring either BTF or BTS involves allocating a portion of memory for use by the processor in storing instruction addresses.

After enabling either of BTF or BTS (where BTF is implemented by older x86 processors and BTS is generally implemented by new x86 processors), kernel 44 may return a confirmation to this one of the threads, indicating that tracing has been enabled. This thread may then re-issue the system call, where kernel 44 may once again attempt to execute this system call, resulting in the error. The underlying processor may generate the trace log that includes a list of instruction addresses executed by the processor. If kernel 44 determines that a context switch is to be performed (whereby the current execution of the one of the threads that re-issued the system call is halted and execution of another one of the threads is resumed or started), kernel 44 may disable tracing as part of performing this context switch, re-enabling tracing when context switching back to the one of the threads that re-issued the system call prior to continuing to execute this thread. In this manner, kernel 44 may trace execution of a system call issued to the operating system by one of the one or more threads corresponding to one of processes 28 currently being executed by primary control unit 24 to generate a trace log that traces execution of the system call without tracing execution of any other ones of the one or more threads corresponding to those of processes 28 that are not currently being executed by primary control unit 20.

The techniques may therefore promote more targeted trace logs that may permit operating system developers to more easily identify programming errors that result in system call failures. As described in more detail below, the techniques may also provide a way to translate trace logs, which commonly specify a list of instruction addresses, to a human-readable text file, which may further facilitate developers in identifying these programming errors. By being able to potentially more quickly and accurately identify programming errors using the human-readable text file provided by the techniques described in this disclosure, the techniques may enable developers to more quickly correct these programming errors. Considering the disabling effect such system call errors may have on computing devices and, more particularly, network routers that provide high-availability routing functionality (such as router 10), the techniques may facilitate more timely error correction, which may increase network reliability or otherwise reduce network device downtimes.

While the operating system tracing techniques may be described above with respect to a particular type of computing device, i.e., router 10, the techniques may be implemented by any type of computing device, including network devices (such as router 10). The techniques described in this disclosure should therefore not be limited in this respect but may be implemented by any computing device capable of executing an operating system and a plurality of threads of one or more processes.

Figure 2:
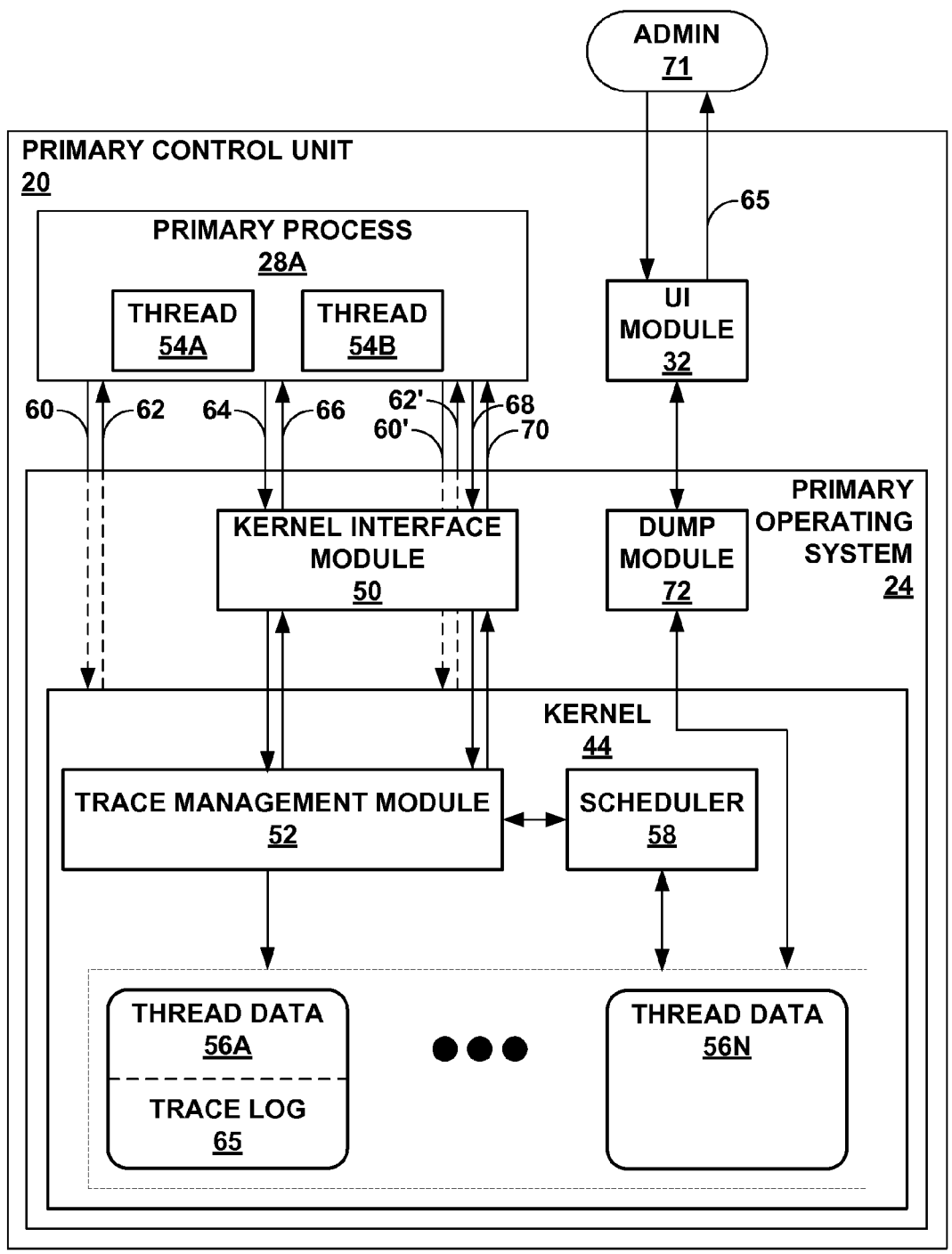
FIG. 2 is a block diagram illustrating the primary control unit of the router shown in the example of FIG. 1 in more detail.

FIG. 2 is a block diagram illustrating primary control unit 20 of router 10 shown in the example of FIG. 1 in more detail. In the example of FIG. 2, primary control unit 20 includes, as described above with respect to FIG. 1, primary operating system 24, UI module 32 and primary processes 34. Primary operating system 24 also includes kernel 44, again as described above with respect to FIG. 1. In addition to these modules, primary operating system 24 includes a kernel interface module 50 and, within kernel 44, a trace management module 52. Kernel interface module 40 represents a module that provides an interface by which primary processes 34 may interact with kernel 44. This kernel interface module 40 may represent a dedicated utility for interacting with trace management module 52 or an interface of an application programmer interface (API) presented generally by primary operating system 24. Trace management module 52 represents a module that manages per-thread traces in accordance with the techniques described in this disclosure.

Each of primary processes 34 may, as described above with respect to the example of FIG. 1, include one or more threads. In the example of FIG. 2, one of processes 34 is shown as primary process 28A. Primary process 28A includes threads 54A and 54B, each of which represents a thread of instruction execution. Kernel 44 spawns each of threads 54A, 54B ("threads 54") when executing primary process 28A, where kernel 44 may instantiate an object or other data structure to maintain data concerning each of threads 54. This data is shown as thread data 56A-56N ("thread data 56"), where it is assumed for purposes of illustration that thread data 56A corresponds to thread 54A and thread data 56B corresponds to thread 54B. Each of thread data 56 may store data to specify or otherwise configure a context in which these threads operate and thereby permit context switching amongst those threads executed by kernel 44. Kernel 44 includes a scheduler 58 that schedules execution of threads 54 (and other threads not shown in the example of FIG. 2 for ease of illustration purposes that correspond to other ones of primary processes 34).

In performing a context switch to switch between threads 54, scheduler 58 stores the context (which may include an instruction pointer, register values, and other information to facilitate execution of the thread) to one of thread data 56 corresponding to the one of threads 54 currently being executed, accesses thread data 56 for the one of threads 54 to be executed next and loads the one of thread data 56 maintained for this one of threads 54 to re-establish its execution context. Scheduler 58 then executes this next one of threads 54 until another context switch is performed to execute another one of threads 54. Scheduler 58 may maintain a thread execution schedule that indicates a duration (often in the form of processor clock cycles) that each thread is to be executed. By enabling context switching in this manner, scheduler 58 may permit a processor to execute multiple threads in what may be referred to as a "concurrent" or "parallel" manner. In other words, a processor may concurrently execute multiple threads in parallel by way of an operating system scheduler that context switches between these threads.

Assuming primary control unit 20 is currently executing thread 54A for purposes of illustration, thread 54A may issue a system call 60 to primary operating system 24. Thread 54A may invoke the system API, which includes this system call 60. This system API is typically separate from kernel interface module 50, which as noted above may comprise a separate utility from the system API. Kernel 44 may receive this system call 60 and then execute system call 60. However, during execution of system call 60, kernel 44 may fail to properly execute this system call 60. This failure may be a result of any number of errors in executing system call 60, such as a corrupted memory address, a corrupted system call 60, a time-out in executing system call 60, a critical operating system failure unrelated to handling of system call 60 or any number of other errors common in computing devices that execute operating systems. Kernel 44 may return an error indication 62 (denoted as an arrow marked as "62") to process 28A.

Thread 54A may receive this error indication 62. In response to error indication 62, thread 54A may invoke kernel interface module 50 and issue a command 64 to enable tracing for thread 54A. This command 64 may specify a process identifier and/or a thread identifier for which tracing is to be enabled. In response to command 64, kernel interface module 50 interfaces with trace management module 52, instructing trace management module 52 to enable tracing for the thread identified in command 64. Trace management module 52 enables tracing for this thread 54A by locating thread data 56 associated with thread 54A, which in this instance is assumed to be thread data 56A. Trace management module 52 then allocates memory for storing trace log 65 within trace data 56A associated with thread 54A that issued command 64. Next, trace management module 52 interfaces with the underlying processors shown generally as control unit 20 in the example of FIG. 2 to configure either BTF or BTS (assuming these are x86 processors) or some other form of hardware-level (or potentially software-level) tracing. To configure the hardware-level tracing, trace management module 52 may set one or more bits in one or more registers of the processor, while also specifying the starting address of memory allocated for storing trace log 65.

Assuming tracing was successfully enabled, trace management module 52 may update thread data 56A to indicate that tracing has been enabled for corresponding thread 54A. Trace management module 52 then reports that tracing was enabled back to kernel interface module 50. Kernel interface module 50 then generates a message 66 that indicates tracing was enabled for thread 54A, possibly returning the thread or process ID for which tracing was enabled. In response to message 66, thread 54A may re-issue system call 60, where this reissued system call is shown as system call 60'. This re-issued system call 60' again invokes the system API and does not typically invoke kernel interface module 50, which is generally a separate module for use in communicating directly with kernel 44 to perform what may be referred to as debugging or other administrative operations (which is why it is often referred to as a utility rather than an API).

Kernel 44 receives this system call 60' and again attempts to execute system call 60', likely resulting in the same error as before, which is returned to thread 54A as error indication 62'. In response to receiving this error, thread 54A then invokes kernel interface module 50 to disable tracing, issuing a disable tracing command 68 to kernel interface module 50. In response to receiving command 68, kernel interface module 50 then interfaces with trace management module 52, instructing trace management module 52 to disable tracing. To disable tracing, trace management module 52 removes the set bits in the one or more registers of the underlying processor that executes thread 54A and clears the address bits of the register specifying the starting address of trace log 65. Trace management module 52 also updates thread data 56A to indicate that tracing is disable for associated thread 54A. Trace management module 52 then interfaces with kernel interface module 50 to indicate that tracing has been disabled, whereupon kernel interface module 50 issues a message 70 indicating that tracing has been disabled for thread 54A (again possibly by specifying the process or thread ID for which tracing was disabled).

As noted above, tracing is enabled on a per-thread basis. In order to enable per-thread tracing, trace management module 52 may be invoked by scheduler 58 to facilitate the enabling and disabling of tracing when a context switch is required. In the above example, tracing is enabled for thread 54A. Assuming tracing is not enabled for the next thread to be executed according to the schedule maintained by scheduler 58 and that tracing for thread 54A has not completed, scheduler 58 invokes trace management module 52 to temporarily disable tracing when starting the context switch. If tracing is not disabled in this instance, the underlying processor would continue to store addresses of instructions executed by this processor to trace log 65, where these instructions correspond to a thread different from thread 54A. Even assuming tracing is enabled for the next thread to be executed, scheduler 58 may invoke trace management module 52 to properly configure tracing such that the processor stores the addresses of the instructions executed by the processor to the correct trace log so as not to intermix trace logs for different threads. Upon switching the context back to that required to properly execute thread 54, scheduler 58 may again invoke trace management module 52 to properly configure tracing for that thread, where the address specified to enable the processor to properly store the addresses of executed instructions is set such that the address of the executed instructions do no overwrite previously stored addresses of instructions executed. In other words, when re-enabling tracing after a context switch, trace management module 52 sets the address in memory where the processor should store its trace data to the address in the allocated space for trace log 65 following the address in memory referencing the last stored trace data prior to the context switch.

In any event, considering the failure of thread 54A as a result of the error in executing system call 60 by kernel 44, primary process 28A may fail, while primary operating system 24 may also fail, hang, stall or otherwise suspend execution, resulting in a failure of primary operating system 24. An admin, such as admin 71 may restart primary control unit 20 to overcome the failure. Upon restarting primary control unit 20, primary control unit 20 may begin executing primary operating system 24 and failed primary processes 34, except that primary control unit 20 may assume the role of standby control unit, as a result of the failure. Admin 71 may then interact with control unit 20 via an interface presented by UI module 32 so as to access dump module 72. Operating system 24 includes dump module 72 to facilitate the retrieval or "dump" of one or more trace logs, such as trace log 65. Dump module 72 may include the appropriate privileges to access thread data 56 and thereby retrieve trace log 65. As noted above, when tracing is enabled, the processor for which tracing has been enabled may store addresses of instructions executed by the processor to trace log 65. Dump module 72 may return this trace log 65 to UI module 32, which may present it to admin 71 either in the form of a file or visually on a display. Often, UI module 32 provides a file, which as described below in more detail may be provided to developers in order to discover the origin of the error and thereby correct the software bug that resulted in this disabling error.

While the techniques are described above with respect to use of a kernel interface module 50, the techniques may not necessarily require a kernel interface module 50. Instead, the techniques may be implemented in a manner that does not require a kernel interface module 50. For example, thread 54A may receive error indication 62 and rather than interact with kernel interface module 50, issue system call 60' that includes a cookie or other data requesting that tracing be enabled for thread 54A prior to execution of system call 60'. Kernel 44 may receive this cookie-augmented system call 60' and invoke trace management module 52 in response to detecting the cookie. Trace management module 52 may then enable tracing in the manner described above, whereupon kernel 44 may then execute system call 60'. Upon encountering the error, kernel 44 may interface with trace management module 52, requesting that trace management module 52 disable tracing. Once tracing has been disabled, kernel 44 may then issue error indication 62'. In this way, the techniques may not require kernel interface module 50 to enable and disable tracing but instead incorporate such functionality into kernel 44, using cookies or other data within system calls to enable communications between trace management module 52 and threads.

Figure 3:
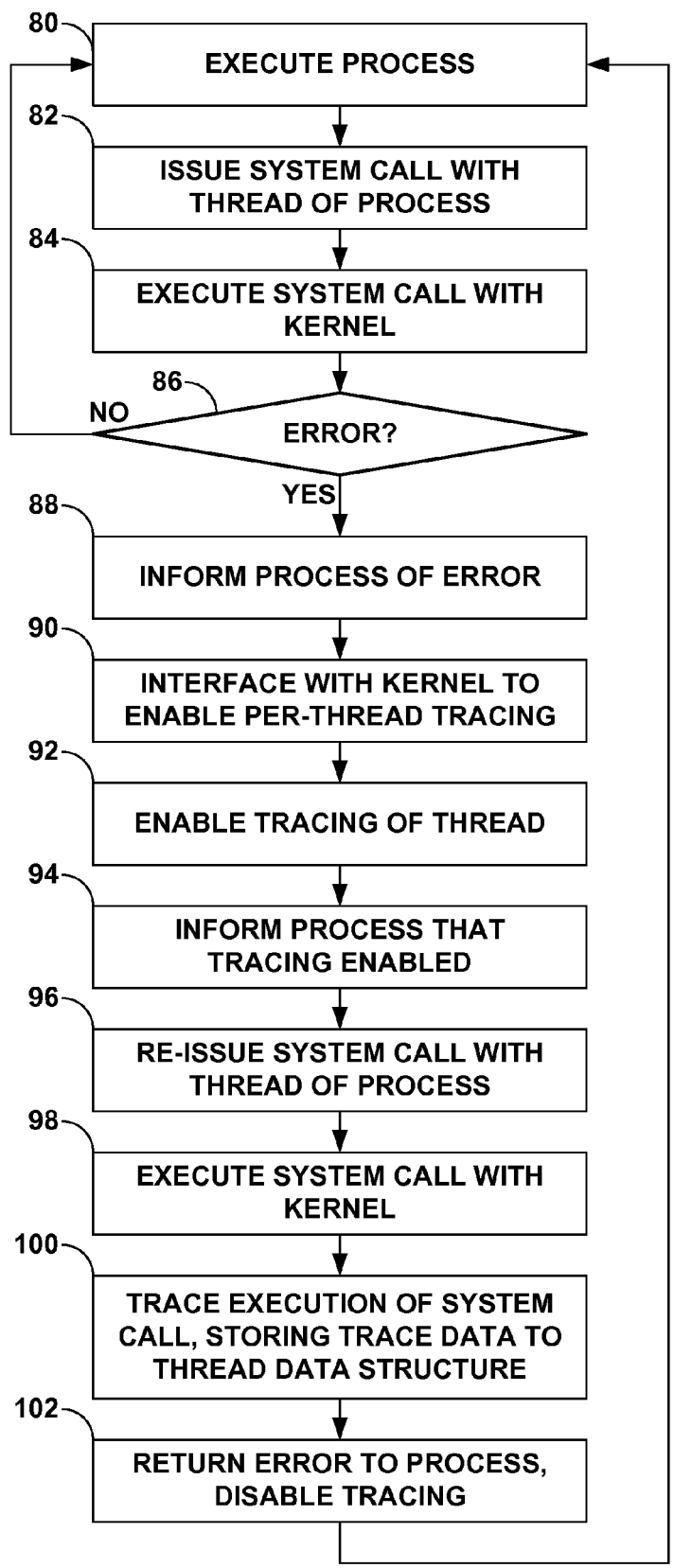
FIG. 3 is a flow chart illustrating example operation of a computing device in implementing the operating system tracing techniques described in this disclosure.

FIG. 3 is a flow chart illustrating example operation of a computing device, such as router 10 shown in the example of FIG. 1, in implementing the operating system tracing techniques described in this disclosure. Initially, primary control unit 20 of router 10 executes primary processes 28, one of which is shown in more detail as primary process 28A in the example of FIG. 2 (80). Referring to the more detailed FIG. 2, thread 54A of primary process 28A issues a system call 60 to kernel 44 of operating system 24 executed by control unit 20 (82). Kernel 44 executes this system call 60 in the manner described above (84). If kernel 44 executes system call 60 without error ("NO" 86), kernel 44 continues to execute process 28A. However, if while executing system call 60, an error occurs ("YES" 86), kernel 44 returns an error message or some other identifier 62 to thread 54A of process 28A that informs process 28A of the error (88).

In response to this error, thread 54A interfaces with kernel 44 via kernel interface module 50 to enable per-thread tracing in the manner described above (90). Typically, thread 54A invokes kernel interface module 50 and issues a command 64 to kernel interface module 50 indicating that tracing should be enabled for thread 54A, as identified by a thread identifier. Kernel interface module 50 interfaces with trace management module 52, which in turn enables tracing for thread 54A in the manner described above (92). Once tracing has been enabled for tracing execution of instructions associated with thread 54A, trace management module 52 interfaces with kernel interface module 50 to inform process 28A that tracing has been enabled for thread 54A (94). Thread 54A, after being informed that tracing is enabled, then re-issues system call 60 in the form of system call 60' to kernel 44, which executes system call 60', often resulting in the same error in executing this system call 60' as when executing system call 60 (96, 98).

When executing system call 60', however, control unit 20 stores addresses where instructions that are executed by control unit 20 are stored to memory in trace log 65 included within thread data 54A, again as described above (100). Kernel 44 returns the error to thread 54A of process 28A, which again invokes kernel interface module 50, issuing a command 68 to disable tracing in response to receiving indication 62' of the error, where trace management module 52 then disables tracing for this thread 54A in the manner described above (102). In this manner, the techniques may enable per-thread tracing for tracing of operations performed by a single thread to generate a trace log 65 focuses on a particular error prone thread without also tracing any other threads that may be executed by the processor. As a result of enabling the creation of granular per-thread tracing logs, developers of operating systems 24 may more easily identify errors or software bugs that result in faulty operating system operation.

Figure 4:
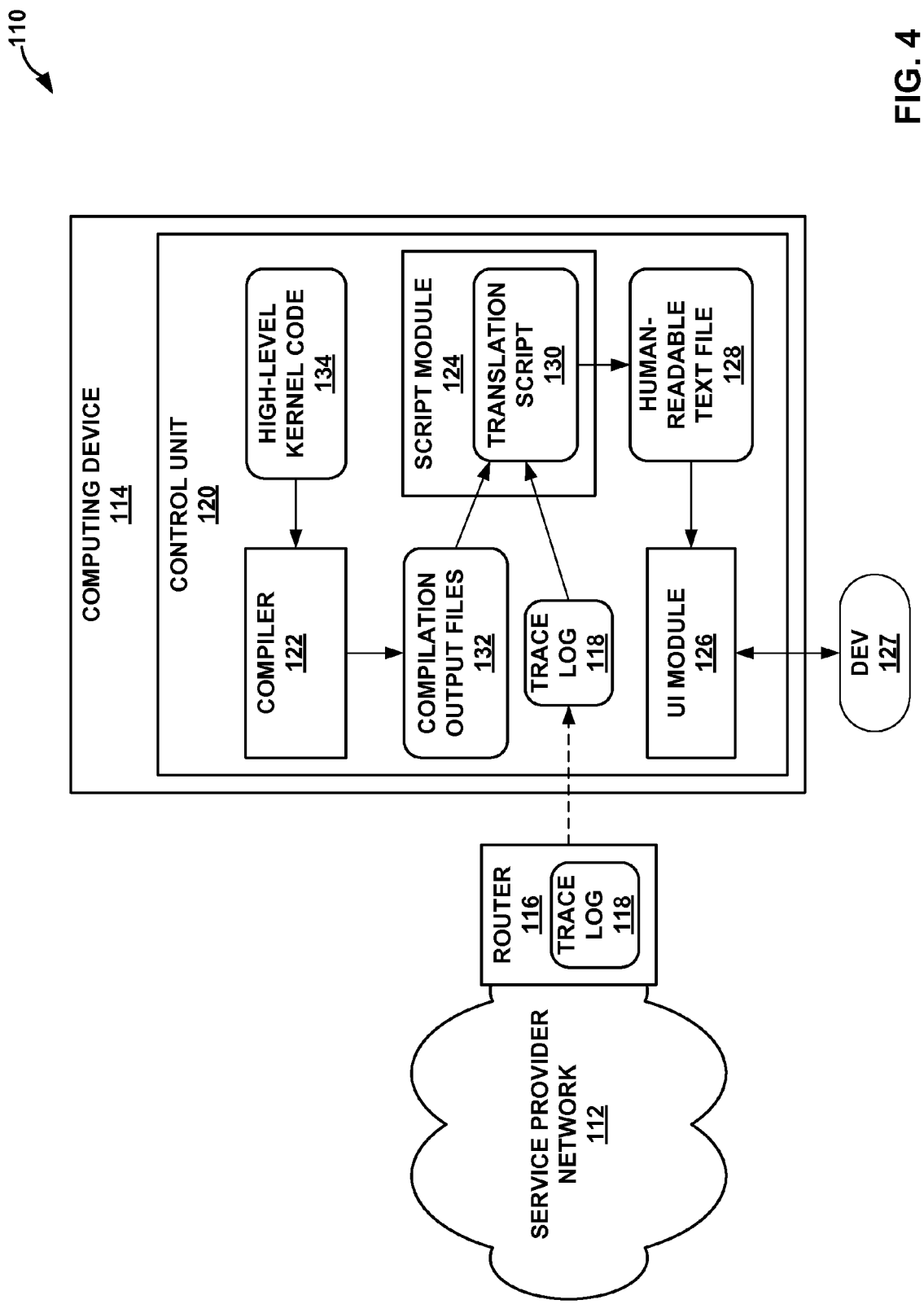
FIG. 4 is a block diagram illustrating a system that implements various aspects of the techniques described in this disclosure to facilitate creation of a human-readable version of a per-thread trace log.

FIG. 4 is a block diagram illustrating a system 110 that implements various aspects of the techniques described in this disclosure to facilitate creation of a human-readable version of a per-thread trace log. In the example of FIG. 4, system 110 includes a service provider network 112 and a computing device 114. Service provider network 112 includes a router 116, which may be substantially similar to router 10 shown in the example of FIGS. 1 and 2. While not explicitly shown in the example of FIG. 4, computing device 114 may reside at an enterprise facility where developers develop the operating system executed by router 116, which may be substantially similar to operating system 24 executed by router 10. Assuming router 116 implements the per-thread trace log creation techniques described above with respect to FIGS. 1-3, router 116 is assumed to generate trace log 118 in accordance with these aspects of the techniques for purposes of illustration.

Computing device 114 includes a control unit 120, which may be substantially similar to control units 20, 22 described above with respect to FIGS. 1, 2 in terms of its implementation. That is, control unit 120 may represent one or more processors (not shown in FIG. 1) that execute software instructions, such as those used to define a software or computer program, stored to a non-transitory computer-readable medium (again, not shown in FIG. 1), such as a storage device (e.g., a disk drive, or an optical drive), or memory (such as Flash memory, random access memory or RAM) or any other type of volatile or non-volatile memory, that stores instructions to cause the one or more processors to perform the techniques described herein. Alternatively, control unit 120 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 120 includes a compiler module 122 ("compiler 122"), a script module 124 and a user interface (UI) module 126 ("UI module 126"). Compiler 122 represents a module that compiles high-level code written in a high-level programming language, such as C++, Java, Visual Basic or other high-level programming language, to low-level code that conforms to a low-level programming language, such as a machine or assembly programming language specific to the underlying hardware on which this low-level code is to be executed. Script module 124 represents a module that executes scripts, which are a form of control code for manipulating or processing data that conforms to a scripting language, such as Perl. Typically, scripting module 124 does not compile scripts, but parses each script, performing operations indicated by the parsed components or commands specified by the script. UI module 126 may represent a module with which a developer, such as developer 127 ("dev 127"), interfaces to interact with control unit 120 of computing device 114.

As noted above, router 116 may generate trace log 118 that specifies a series of addresses identifying a location of instructions executed by the control unit of router 116 (which is not shown for ease of illustration purposes but assumed to be substantially similar to control unit 20 shown in the example of FIGS. 1, 2). An administrator, such as admin 71, may interface with primary control unit 20 to retrieve trace log 65 in the manner described above and provide this trace data 65 to dev 127 for purposes of enabling dev 127 to troubleshoot the error. Alternatively, dev 127 may interface with UI module 126 to retrieve this trace log 118 from router 116 without involving admin 71 (assuming admin 71 enables dev 127 access to router 116). In some instances, router 116 may automatically forward or otherwise upload trace log 118 to computing device 114 upon the creation of trace log 118.

Regardless of how trace log 118 is provided to dev 127, dev 127 may interface with UI module 126 to generate human-readable version of trace log 118, as addresses of instruction stored to trace log 118 are not typically easily readable by a human. This human-readable version of trace log 118 is shown in the example of FIG. 4 as "human-readable text file 128." In order to generate human-readable text file 128, dev 127 interfaces with control unit 120 via a user interface presented by UI module 126 to invoke script module 124. Once invoked, dev 127 interfaces with script module 124 via this or another user interface presented by UI module 126 to cause script module 124 to execute translation script 130 with respect to trace log 118. Translation script 130 relies on compilation output files 132 output by compiler 122 when finished compiling high-level kernel code 134.

That is, compiler 122 compiles high-level kernel code 134, which is written in a high-level programming language, such as C, C++, Java or any other high-level programming language, into one or more compilation output files 132. Compilation output files 132 may comprise an object file, which itself includes a number of files that define one or more of the low-level code that conforms to a low-level programming language (which is often referred to as "target code"), header information, symbol table that define symbols for use in linking, and possibly debugging information. Translation script 130 may parse these files 132 in view of the addresses specified by trace log 118 to generate human-readable text file 128. In particular, translation script 130 may parse portions of files 132 specifying the instructions referenced by the addresses stored to trace log 118, effectively de-compiling the instruction referenced by the addresses stored to trace log 118 to re-generate the portion of high-level kernel code 134 that resulted in the error experienced by router 116. Human-readable text file 128 may specify a function that was called, a file in which this function is specified and a line in the file where that function is specified as well as any number of other criteria that can be parsed from output files 132 for use in debugging software bugs in operating systems.

After generating human-readable text file 128, dev 127 may review human-readable text file 128 via a word processor or other application presented by UI module 126. Dev 127 may then alter or change high-level kernel code 134 based on human-readable text file 128 to correct for any identified software bugs that may have resulted in the error. While shown in the example of FIG. 4 as including a compiler 122 and high-level kernel code 134, control unit 120 may only store compilation output files 132 and need not necessarily execute compiler 122 on the same device as that used to generate human-readable text file 128. The techniques should therefore not be limited in this respect to the example of FIG. 4.

Figure 5:
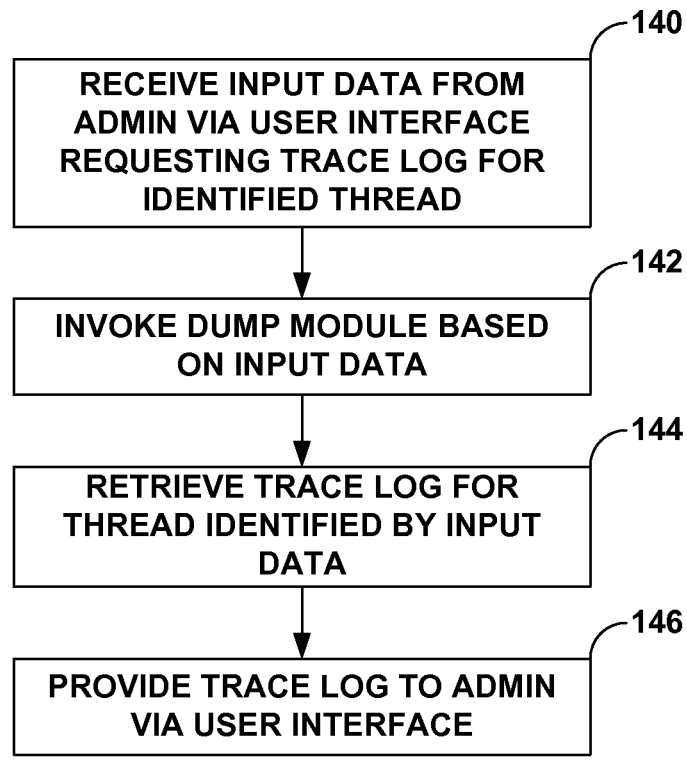
FIG. 5 is a flowchart illustrating exemplary operation of a computing device in providing a thread-specific trace log to a user in accordance with the techniques described in this disclosure.

FIG. 5 is a flowchart illustrating exemplary operation of a computing device, such as router 10 shown in the example of FIGS. 1, 2, in providing a thread-specific trace log to a user in accordance with the techniques described in this disclosure. Referring to the example of FIG. 2 for illustration purposes, an administrator, such as admin 71, may determine that primary control unit 20 has failed, resulting in standby control unit 22 assuming the role of primary control unit and controlling routing functionality of router 10. Typically, as noted above standby control unit 22 may also fail due to the same error, which may raise critical issues that admin 71 is required to address to return router 10 and the rest of the network in which router 10 resides back to normal network operations. As a result of this error, admin 71 may become aware of the failure and interface with primary control unit 20 (or standby control unit 22 considering that standby control unit 22 is substantially similar to primary control unit 20 and also failed) via a user interface presented by UI module 32 to discover the source of the error.

In attempting to resolve this error, admin 71 may input data requesting a trace log for one or more threads that failed, such as thread 54A. UI module 32 may receive this input data from admin 71 requesting trace log 65 associated with thread 54A (140). UI module 32 may invoke dump module 72 based on this input data (142). Dump module 72 may then retrieve trace log 65 for thread 54A identified by the input data (144). Dump module 72 may then provide trace log 65 to admin 71 via the user interface presented by UI module 32. In this manner, admin 71 may retrieve trace log 65, which admin 71 may provide to developers of primary operating system 24 so that developers may identify the source of the error and potentially patch operating system 24 to prevent or at least reduce future occurrences of the error.

Figure 6:
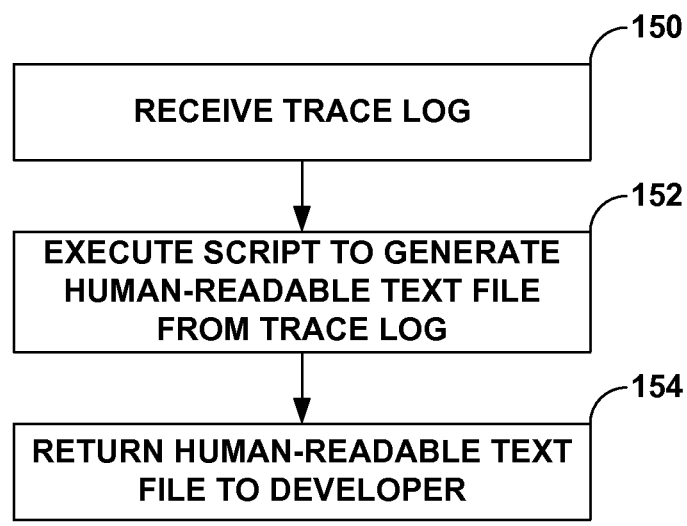
FIG. 6 is a flowchart illustrating exemplary operating of a developer computing device in producing a human-readable version of a thread-specific trace log generated in accordance with the techniques described in this disclosure.

FIG. 6 is a flowchart illustrating exemplary operating of a developer computing device, such as computing device 114 shown in the example of FIG. 4, in producing a human-readable version of a thread-specific trace log generated in accordance with the techniques described in this disclosure. Initially, control unit 120 of computing device 114 receives trace log 118 (150). Developer 127 interfaces with a user interface presented by UI module 126 to invoke script module 124. Once invoked, developer 127 directs script module 124 to execute translation script 130 so as to generate human-readable text file 128 from trace log 118, as described above (152). Script module 126 may then return human-readable text file 128 to developer 127 in the manner described above (154).

For example, UI module 126 may present human-readable text file 128 via a user interface for review by developer 127. An example portion of human-readable text file 128 is provided below.

syscall( ) trap.c:1304
    write( ) sys_generic.c:313
      kern_writev( ) sys_generic.c:395
        fget_write( ) kern_descrip.c:2024,1980,1980 filedesc.h:1812

In this example portion of human-readable text file 128, a first function referred to as "syscall( )" is called, which is located in a high-level kernel code file 134 referred to as "trap.c" beginning at line number 1304. In executing this syscall function, a "write( )" function is called, which is located in a high-level kernel code file 134 referred to as "sys_generic.c" beginning at line 313. In executing this "write( )" function, another function referred to as "kern_writev( )" is called, which is located in the sys_generic.c file beginning at line 395. In executing this kern_writev( ) function, yet another function referred to as "fget_write( )" is called, which is located in high-level kernel code file 134 denoted as "kern_descrip.c" at lines 2024, 1980, 1980 (where this function may be overloaded, hence the multiple line references) and also referenced in a "filedesc.h" file 134 beginning at line 1812. While only a portion of human-readable text file 128 is provided, human-readable text file 128 may continue in this manner tracing functions and child functions called by the parent function, specifying where in high-level kernel code files 134 these functions may be found, thereby permitting developer 127 to effectively trace execution of this system call through high-level kernel code files 134.

Various embodiments of the invention have been described. These and other embodiments are within the scope of the following claims.

The invention claimed is:

1. A method comprising:
concurrently executing a plurality of software processes by an operating system of a control unit of a network device, wherein each of the plurality of processes comprises an instance of one of a plurality of application programs, wherein each of the plurality of processes comprises one or more separate threads of instruction execution;
in response to determining that an error has occurred when executing a system call issued by a first one of the one or more threads, configuring the operating system to enable tracing for the first one of the one or more threads but not a second one of the one or more threads corresponding to the one or any other one of the plurality of processes and reissuing the system call with the first one of the one or more threads; and
tracing, with the control unit, execution of the reissued system call to generate a trace log that traces execution of the system call by the operating system without the trace log tracing execution of any other ones of the one or more threads corresponding to those of the plurality of processes that are also being executed by the operating system during execution of the system call.

2. The method of claim 1, further comprising:
prior to tracing the system call, configuring the control unit to trace the reissued system call;
performing a context switch during execution of the reissued system call with a scheduler of the operating system so as to concurrently execute the second one of the one or more threads; and
when performing the context switch, configuring the control unit to temporarily disable tracing so as not to trace execution of the second one of the one or more threads.

3. The method of claim 2,
wherein configuring the control unit to trace the reissued system call system call comprises setting one or more bits within one or more registers of a processor included within the control unit to enable the tracing of the reissued system call, and
wherein configuring the control unit to temporarily disable tracing comprises setting the one or more bits within the one or more registers of the processor to disable the tracing of the reissued system call.

4. The method of claim 1, further comprising:
determining that a first error has occurred when executing the system call;
returning the first error to the first one of the one or more threads that issued the system call,
wherein configuring the operating system to enable tracing comprises:
in response to the first error, issuing a first command with the first one of the one or more threads to the operating system indicating that tracing is to be enabled for the one of the one or more threads that issued the system call;
enabling, with the operating system, tracing of the first one of the one or more threads in response to the first command without enabling tracing for any other of the one or more threads corresponding to the plurality of application programs executed by the control unit; and
issuing a first message from the operating system to the first one of the one or more threads that issued the system call indicating that tracing has been enabled for the first one of the one or more threads that issued the system call;
wherein reissuing the system call comprises, in response to the first message, re-issuing the system call to the operating system,
wherein the method further comprises:
determining that a second error occurred when executing the re-issued system call, wherein the first error is the same as the second error;
returning the second error to the one or more threads that re-issued the system call;
in response to the second error, issuing a second command with the first one of the one or more threads to the operating system indicating that tracing is to be disabled for the first one of the one or more threads that re-issued the system call; and
disabling, with the operating system, tracing of the first one of the one or more threads in response to the second command without disabling tracing for any other of the one or more threads corresponding to the plurality of application programs executed by the control unit.

5. The method of claim 4, further comprising storing thread data for each of the one or more threads that defines a context in which each of the one or more threads is to be executed by the control unit,
wherein enabling tracing of the one of the one or threads comprises:
allocating memory for use by the control unit in tracing the execution of the re-issued system call;
updating the thread data for the first one of the one or more threads that re-issued the system call to reference the allocated memory;
configuring the control unit to enable tracing by the control unit; and
updating the thread data after configuring the control unit to indicate that tracing is enabled for the first one of the one or more threads that re-issued the system call.

6. The method of claim 5, wherein configuring the control unit to enable tracing comprising setting one or more bits in one or more registers of the control unit to indicate that the control unit is to perform tracing.

7. The method of claim 5,
wherein the control unit comprises an x86 processor that supports either a single-set on branches (BTF) hardware-level trace or a branch trace store (BTS) hardware-level trace, and
wherein configuring the control unit to enable tracing comprises configuring a register included within the x86 processor to enable either the BTF tracing or the BTS tracing.

8. The method of claim 1, further comprising:
determining that a first error has occurred when executing the system call;
returning the first error to the first one of the one or more threads that issued the system call;
wherein configuring the operating system to enable tracing and reissuing the system call comprises:
in response to the first error, re-issuing the system call to the operating system, wherein the re-issued system call includes additional data that indicates that tracing is to be enabled for the first one of the one or more threads that re-issued the system call; and
enabling, with the operating system, tracing of the first one of the one or more threads in response to the additional data included within the re-issued system call without enabling tracing for any other of the one or more threads corresponding to the plurality of application programs executed by the control unit;
wherein the method further comprises:
determining that a second error occurred when executing the re-issued system call, wherein the first error is the same as the second error;
disabling, with the operating system, tracing of the first one of the one or more threads in response to determining that the second error occurred when executing the re-issued system call without disabling tracing for any other of the one or more threads corresponding to the plurality of application programs executed by the control unit; and
returning the second error to the first one of the one or more threads that re-issued the system call.

9. The method of claim 1, further comprising:
storing thread data for each of the one or more threads that defines a context in which each of the one or more threads is to be executed by the control unit
allocating memory for use by the control unit in tracing the execution of the system call;
updating the thread data for the first one of the one or more threads that issued the system call to include the allocated memory;
configuring the control unit to enable tracing for the first one of the one or more threads;
updating the thread data after configuring the control unit to indicate that tracing is enabled for the first one of the one or more threads that issued the system call;
storing addresses of instructions of the first one of the one or more threads executed by the control unit to the allocated memory so as to generate the trace log when tracing the execution of the reissued system call issued to the operating system by the first one of the one or more threads; and
in response to determining that an error occurred during execution of the reissued system call, configuring the control unit to disable tracing for the first one of the one or more threads and updating the thread data to indicate that tracing is disabled for the first one of the one or more threads that reissued the system call.

10. The method of claim 9,
wherein configuring the control unit to enable tracing comprises:
configuring the control unit to enable tracing for the first one of the one or more threads while the control unit executes the first one of the one or more threads when the thread data for the first one of the one or more threads indicates that tracing is enabled for the first one of the one or more threads;
prior to configuring the control unit to disable tracing for the first one of the one or more threads in response to determining that the error during execution of the reissued system call, performing a context switch with a scheduler of the operating system so that the control unit executes the second one of the one or more threads instead of the first thread;
in performing the context switch, configuring the control unit to disable tracing for the first one of the one or more threads;
after disabling tracing for the first one of the one or more threads, executing the second one of the one or more threads with the control unit; and
when performing another context switch so that the control unit executes the first one of the one or more threads rather than the second one of the one or more threads, configuring the control unit to re-enable tracing for the first one of the one or more threads.

11. The method of claim 9, further comprising:
providing the trace log to a computing device that includes compilation files generated when compiling the operating system; and
generating a human-readable version of the trace log based on the trace log and the compilation files generated when compiling the operating system.

12. A computing device comprising:
a plurality of processes, wherein each of the plurality of processes comprises an instance of one of a plurality of application programs, wherein each of the plurality of processes comprises one or more separate threads of instruction execution;
an operating system; and
a control unit that executes the operating system,
wherein the operating system concurrently executes the plurality of processes,
wherein a first thread of the one or more threads of one of the plurality of processes configures, in response to determining that an error has occurred during execution of a system call issued by the first thread, the operating system to enable tracing for the first thread but not a second thread of the one or more threads corresponding to the one or any other one of the plurality of processes and reissues the system call, and
wherein the control unit traces execution of the reissued system call to generate a trace log that traces execution of the system call by the operating system without the trace log tracing execution of any other ones of the one or more threads corresponding to those of the plurality of processes that are also being executed by the operating system during execution of the system call.

13. The computing device of claim 12,
wherein the operating system, prior to tracing the reissued system call, configures the control unit to trace the reissued system call;
wherein the operating system comprises a scheduler that performs a context switch during execution of the reissued system call so as to concurrently execute the second thread, and
wherein the scheduler, when performing the context switch, configures the control unit to temporarily disable tracing so as not to trace execution of the second thread.

14. The computing device of claim 13,
wherein the operating system further sets one or more bits within one or more registers of a processor included within the control unit to enable the tracing of the reissued system call and sets the one or more bits within the one or more registers of the processor to disable the tracing of the reissued system call.

15. The computing device of claim 12,
wherein the operating system determines that a first error has occurred when executing the system call and returns the first error to the first thread that issued the system call;
wherein the first thread that issued the system call, in response to the first error, issues a first command to the operating system indicating that tracing is to be enabled for the first thread that issued the system call;
wherein the operating system enables tracing of the first thread in response to the first command without enabling tracing for any other of the one or more threads corresponding to the plurality of application programs executed by the control unit and issues a first message to the first thread that issued the system call indicating that tracing has been enabled for the first thread that issued the system call,
wherein the first thread that issued the system call, in response to the first message, re-issues the system call to the operating system,
wherein the control unit traces execution of the re-issued system call,
wherein the operating system determines that a second error occurred when executing the re-issued system call, wherein the first error is the same as the second error, and returns the second error to the first thread that re-issued the system call;
wherein the first thread that issued the system call, in response to the second error, issues a second command to the operating system indicating that tracing is to be disabled for the first thread that re-issued the system call, and
wherein the operating system disables tracing of the first thread in response to the second command without disabling tracing for any other of the one or more threads corresponding to the plurality of application programs executed by the control unit.

16. The computing device of claim 15, wherein the operating system includes a scheduler that stores thread data for each of the one or more threads that defines a context in which each of the one or more threads is to be executed by the control unit, allocates memory for use by the control unit in tracing the execution of the re-issued system call, updates the thread data for the first thread that re-issued the system call to reference the allocated memory, configures the control unit to enable tracing, and updates the thread data after configuring the control unit to indicate that tracing is enabled for the first thread that re-issued the system call.

17. The computing device of claim 16, wherein the scheduler sets one or more bits in one or more registers of the control unit to indicate that the control unit is to perform tracing.

18. The computing device of claim 16,
wherein the control unit comprises an x86 processor that supports either a single-set on branches (BTF) hardware-level trace or a branch trace store (BTS) hardware-level trace, and
wherein the scheduler configures a register included within the x86 processor to enable either the BTF tracing or the BTS tracing.

19. The computing device of claim 12,
wherein the operating system determines that a first error has occurred when executing the system call and returns the first error to the first thread that issued the system call;
wherein the first thread that issued the system call, in response to the first error, re-issues the system call to the operating system, wherein the re-issued system call includes additional data that indicates that tracing is to be enabled for the first thread that re-issued the system call,
wherein the operating system enables tracing of the first thread in response to the additional data included within the re-issued system call without enabling tracing for any other of the one or more threads corresponding to the plurality of application programs executed by the control unit, determines that a second error occurred when executing the re-issued system call, wherein the first error is the same as the second error, disables tracing of the first thread in response to determining that the second error occurred when executing the re-issued system call without disabling tracing for any other of the one or more threads corresponding to the plurality of application programs executed by the control unit and returns the second error to the first thread that re-issued the system call.

20. The computing device of claim 12,
wherein the operating system includes a scheduler that stores thread data for each of the one or more threads that defines a context in which each of the one or more threads is to be executed by the control unit, allocates memory for use by the control unit in tracing the execution of the reissued system call, updates the thread data for the first thread that reissued the system call to include the allocated memory, configures the control unit to enable tracing for the first thread, and updates the thread data after configuring the control unit to indicate that tracing is enabled for the first thread that reissued the system call,
wherein the control unit stores addresses of instructions of the first thread executed by the control unit to the allocated memory so as to generate a trace log when tracing the execution of the reissued system call issued to the operating system by the first thread, and
wherein the scheduler, in response to determining that an error occurred during execution of the reissued system call, configures the control unit to disable tracing for the first thread and updating the thread data to indicate that tracing is disabled for the first thread that reissued the system call.

21. The computing device of claim 20,
wherein the scheduler further configures the control unit to enable tracing for the first thread while the control unit executes the first thread when the thread data for the first thread indicates that tracing is enabled for the first thread, prior to configuring the control unit to disable tracing for the first thread in response to determining that the error during execution of the reissued system call, performs a context switch with a scheduler of the operating system so that the control unit executes the second thread instead of the first thread and, in performing the context switch, configures the control unit to disable tracing for the first thread,
wherein the control unit, after tracing has been disabled for the first thread, executes the second thread with the control unit, and
wherein the scheduler, when performing another context switch so that the control unit executes the first thread rather than the second thread, configures the control unit to re-enable tracing for the first thread.

22. The computing device of claim 20,
wherein the computing device further provides the trace log to a computing device that includes compilation files generated when compiling the operating system,
wherein the computing device that includes the compilation files generates a human-readable version of the trace log based on the trace log and the compilation files generated when compiling the operating system.

23. The computing device of claim 12,
wherein the computing device comprise a router that provides high-availability routing functionality,
wherein the control unit comprises a primary control unit,
wherein the plurality of processes comprise a plurality of primary processes,
wherein the operating system comprises a primary operating system,
wherein the one or more threads included within each of the plurality of primary processes comprises one or more primary threads,
wherein the router includes a standby control unit that executes a plurality of standby processes and a standby operating system that supports execution of the plurality of standby processes, wherein each of the plurality of standby processes represent an instance of one of a plurality of standby application programs, wherein each of the plurality of standby processes comprises one or more standby threads that represent separate standby threads of instruction execution,
wherein the standby control unit updates the standby processes and the standby operating system to maintain synchronization between the primary processes and the primary operating system and the standby processes and the standby operating system, respectively,
wherein the primary control unit fails when executing the system call due to an error by the primary operating system in handling the system call, and
wherein the router transitions control from the primary control unit to the standby control unit in response to the primary control unit failing when executing the system call.

24. The computing device of claim 23, wherein after transitioning control to the standby control unit, the standby control unit fails when executing the system call due to an error by the standby operating system in handling the system call that is the same as the error by the primary operating system in handling the same system call.

25. A system comprising:
a network device comprising:
a plurality of processes, wherein each of the plurality of processes comprises an instance of one of a plurality of application programs, wherein each of the plurality of processes comprises one or more separate threads of instruction execution;
an operating system;
a control unit that executes the operating system,
wherein the operating system concurrently executes the plurality of processes, and
wherein a first thread of the one or more threads of one of the plurality of processes configures, in response to determining that an error has occurred during execution of a system call issued by the first thread, the operating system to enable tracing for the first thread but not a second thread of the one or more threads corresponding to the one or any other one of the plurality of processes and reissues the system call, and
wherein the control unit of the network device traces execution of the reissued system call to generate a trace log that traces execution of the system call by the operating system without the trace log tracing execution of any other ones of the one or more threads corresponding to those of the plurality of processes that are also being executed by the operating system during execution of the system call; and
a computing device comprising a control unit that stores compilation files generated when compiling the operating system, receives the trace log, and generates a human-readable version of the trace log based on the trace log and the compilation files generated when compiling the operating system.

26. The system of claim 25,
wherein the operating system, prior to tracing the reissued system call, configures the control unit of the network device to trace the reissued system call;
wherein the operating system comprises a scheduler that performs a context switch during execution of the reissued system call so as to concurrently execute the second thread, and
wherein the scheduler, when performing the context switch, configures the control unit of the network device to temporarily disable tracing so as not to trace execution of the second thread.

27. The system of claim 26,
wherein the operating system further sets one or more bits within one or more registers of a processor included within the control unit of the network device to enable the tracing of the reissued system call and sets the one or more bits within the one or more registers of the processor to disable the tracing of the reissued system call.

28. The system of claim 25,
wherein the operating system determines that a first error has occurred when executing the system call and returns the first error to the first thread that issued the system call;
wherein the first thread that issued the system call, in response to the first error, issues a first command to the operating system indicating that tracing is to be enabled for the first thread that issued the system call;
wherein the operating system enables tracing of the one first thread in response to the first command without enabling tracing for any other of the one or more threads corresponding to the plurality of application programs executed by the control unit of the network device and issues a first message to the first thread that issued the system call indicating that tracing has been enabled for the first thread that issued the system call,
wherein the first thread that issued the system call, in response to the first message, re-issues the system call to the operating system,
wherein the control unit of the network device traces execution of the re-issued system call,
wherein the operating system determines that a second error occurred when executing the re-issued system call, wherein the first error is the same as the second error, and returns the second error to the first thread that re-issued the system call;
wherein the first thread that issued the system call, in response to the second error, issues a second command to the operating system indicating that tracing is to be disabled for the first thread that re-issued the system call, and
wherein the operating system disables tracing of the first thread in response to the second command without disabling tracing for any other of the one or more threads corresponding to the plurality of application programs executed by the control unit of the network device.

29. The system of claim 28, wherein the operating system includes a scheduler that stores thread data for each of the one or more threads that defines a context in which each of the one or more threads is to be executed by the control unit of the network device, allocates memory for use by the control unit of the network device in tracing the execution of the re-issued system call, updates the thread data for the first thread that re-issued the system call to reference the allocated memory, configures the control unit of the network device to enable tracing, and updates the thread data after configuring the control unit of the network device to indicate that tracing is enabled for the first thread that re-issued the system call.

30. The system of claim 29, wherein the scheduler sets one or more bits in one or more registers of the control unit of the network device to indicate that the control unit of the network device is to perform tracing.

31. The system of claim 29,
wherein the control unit of the network device comprises an x86 processor that supports either a single-set on branches (BTF) hardware-level trace or a branch trace store (BTS) hardware-level trace, and
wherein the scheduler configures a register included within the x86 processor to enable either the BTF tracing or the BTS tracing.

32. The system of claim 25,
wherein the operating system determines that a first error has occurred when executing the system call and returns the first error to the first thread that issued the system call;
wherein the first thread that issued the system call, in response to the first error, re-issues the system call to the operating system, wherein the re-issued system call includes additional data that indicates that tracing is to be enabled for the first thread that re-issued the system call,
wherein the operating system enables tracing of the first thread in response to the additional data included within the re-issued system call without enabling tracing for any other of the one or more threads corresponding to the plurality of application programs executed by the control unit of the network device, determines that a second error occurred when executing the re-issued system call, wherein the first error is the same as the second error, disables tracing of the one of the one or more threads in response to determining that the second error occurred when executing the re-issued system call without disabling tracing for any other of the one or more threads corresponding to the plurality of application programs executed by the control unit of the network device and returns the second error to the first thread that re-issued the system call.

33. The system of claim 25,
wherein the operating system includes a scheduler that stores thread data for each of the one or more threads that defines a context in which each of the one or more threads is to be executed by the control unit of the network device, allocates memory for use by the control unit of the network device in tracing the execution of the reissued system call, updates the thread data for the first thread that reissued the system call to include the allocated memory, configures the control unit of the network device to enable tracing for the first thread, and updates the thread data after configuring the control unit of the network device to indicate that tracing is enabled for the first thread that reissued the system call,
wherein the control unit of the network device stores addresses of instructions of the first thread executed by the control unit of the network device to the allocated memory so as to generate a trace log when tracing the execution of the reissued system call, and
wherein the scheduler, in response to determining that an error occurred during execution of the reissued system call, configures the control unit of the network device to disable tracing for the first thread and updating the thread data to indicate that tracing is disabled for the first thread that reissued the system call.

34. The system of claim 33,
wherein the scheduler further configures the control unit of the network device to enable tracing for the first thread while the control unit of the network device executes the first thread when the thread data for the first thread indicates that tracing is enabled for the first thread, prior to configuring the control unit of the network device to disable tracing for the first thread in response to determining that the error during execution of the reissued system call, performs a context switch with a scheduler of the operating system so that the control unit of the network device executes the second thread instead of the first thread and, in performing the context switch, configures the control unit of the network device to disable tracing for the first thread,
wherein the control unit of the network device, after tracing has been disabled for the first thread, executes the second thread with the control unit of the network device, and
wherein the scheduler, when performing another context switch so that the control unit of the network device executes the first thread rather than the second thread, configures the control unit of the network device to re-enable tracing for the first thread.

35. The system of claim 25,
wherein the network device comprise a router that provides high-availability routing functionality,
wherein the control unit of the network device comprises a primary control unit,
wherein the plurality of processes comprise a plurality of primary processes,
wherein the operating system comprises a primary operating system,
wherein the one or more threads included within each of the plurality of primary processes comprises one or more primary threads,
wherein the router includes a standby control unit that executes a plurality of standby processes and a standby operating system that supports execution of the plurality of standby processes, wherein each of the plurality of standby processes represent an instance of one of a plurality of standby application programs, wherein each of the plurality of standby processes comprises one or more standby threads that represent separate standby threads of instruction execution,
wherein the standby control unit updates the standby processes and the standby operating system to maintain synchronization between the primary processes and the primary operating system and the standby processes and the standby operating system, respectively,
wherein the primary control unit fails when executing the system call due to an error by the primary operating system in handling the system call, and wherein the router transitions control from the primary control unit to the standby control unit in response to the primary control unit failing when executing the system call.

36. The system of claim 35, wherein after transitioning control to the standby control unit, the standby control unit fails when executing the system call due to an error by the standby operating system in handling the system call that is the same as the error by the primary operating system in handling the same system call.

37. An on-transitory computer-readable medium comprising instruction that, when executed, cause one or more processors to:
concurrently executing a plurality of software processes by an operating system of the one or more processors, wherein each of the plurality of processes comprises an instance of one of a plurality of application programs, wherein each of the plurality of processes comprises one or more separate threads of instruction execution;
in response to determining that an error has occurred when executing a system call issued by a first one of the one or more threads, configure the operating system to enable tracing for the first one of the one or more threads but not a second one of the one or more threads corresponding to the one or any other one of the plurality of processes and reissue the system call with the first one of the one or more threads; and
trace execution of the reissued system call to generate a trace log that traces execution of the system call by the operating system without the trace log tracing execution of any other ones of the one or more threads corresponding to those of the plurality of processes that are also being executed by the operating system during execution of the system call.

38. The non-transitory computer-readable medium of claim 37,
wherein the instructions further cause the one or more processors to:
prior to tracing the reissued system call, configure the one or more processors to trace the reissued system call;
perform a context switch during execution of the reissued system call with a scheduler of the operating system so as to concurrently execute the second thread; and
when performing the context switch, configure the one or more processors to temporarily disable tracing so as not to trace execution of the second thread.

39. The non-transitory computer-readable medium of claim 38, wherein the instructions further cause the one or more processors to set one or more bits within one or more registers of the one or more processors to enable the tracing of the reissued system call and set the one or more bits within the one or more registers of the one or more processors to disable the tracing of the reissued system call.

40. The non-transitory computer-readable medium of claim 37, wherein the instructions further cause the one or more processors to:
determine that a first error has occurred when executing the system call;
return the first error to the first thread that issued the system call;
in response to the first error, issue a first command with the first thread to the operating system indicating that tracing is to be enabled for the first thread that issued the system call;
enable, with the operating system, tracing of the first thread in response to the first command without enabling tracing for any other of the one or more threads corresponding to the plurality of application programs executed by the one or more processors;
issue a first message from the operating system to the first thread that issued the system call indicating that tracing has been enabled for the first thread that issued the system call;
in response to the first message, re-issue the system call to the operating system, wherein tracing execution of the system call comprises tracing execution of the re-issued system call,
determine that a second error occurred when executing the re-issued system call, wherein the first error is the same as the second error;
return the second error to the first thread that re-issued the system call;
in response to the second error, issue a second command with the first thread to the operating system indicating that tracing is to be disabled for the first thread that re-issued the system call; and
disable, with the operating system, tracing of the first thread in response to the second command without disabling tracing for any other of the one or more threads corresponding to the plurality of application programs executed by the one or more processors.

41. The non-transitory computer-readable medium of claim 40, wherein the instructions further cause the one or more processors to:
store thread data for each of the one or more threads that defines a context in which each of the one or more threads is to be executed by the one or more processors;
allocate memory for use by the one or more processors in tracing the execution of the re-issued system call;
update the thread data for the first thread that re-issued the system call to reference the allocated memory;
configure the one or more processors to enable tracing by the one or more processors; and
update the thread data after configuring the one or more processors to indicate that tracing is enabled for the first thread that re-issued the system call.

42. The non-transitory computer-readable medium of claim 41, wherein the instructions further cause the one or more processors to set one or more bits in one or more registers of the one or more processors to indicate that the one or more processors is to perform tracing.

43. The non-transitory computer-readable medium of claim 41,
wherein the one or more processors comprise an x86 processor that supports either a single-set on branches (BTF) hardware-level trace or a branch trace store (BTS) hardware-level trace, and
wherein the instructions further cause the x86 processor to configure a register included within the x86 processor to enable either the BTF tracing or the BTS tracing.

44. The non-transitory computer-readable medium of claim 37, wherein the instructions further cause the one or more processors to:
determine that a first error has occurred when executing the system call;
return the first error to the one of the first thread that issued the system call;
in response to the first error, re-issue the system call to the operating system, wherein the re-issued system call includes additional data that indicates that tracing is to be enabled for the first thread that re-issued the system call,
enable, with the operating system, tracing of the first thread in response to the additional data included within the re-issued system call without enabling tracing for any other of the one or more threads corresponding to the plurality of application programs executed by the one or more processors;

determine that a second error occurred when executing the re-issued system call, wherein the first error is the same as the second error;

disable, with the operating system, tracing of the first thread in response to determining that the second error occurred when executing the re-issued system call without disabling tracing for any other of the one or more threads corresponding to the plurality of application programs executed by the one or more processors; and return the second error to the first thread that re-issued the system call.

45. The non-transitory computer-readable medium of claim 37, wherein the instructions further cause the one or more processors to:

store thread data for each of the one or more threads that defines a context in which each of the one or more threads is to be executed by the one or more processors allocate memory for use by the one or more processors in tracing the execution of the reissued system call;

update the thread data for the first thread that reissued the system call to include the allocated memory;

configure the one or more processors to enable tracing for the first thread;

update the thread data after configuring the one or more processors to indicate that tracing is enabled for the first thread that reissued the system call;

store addresses of instructions of the first thread executed by the one or more processors to the allocated memory so as to generate a trace log when tracing the execution of the reissued system call issued to the operating system by the first thread; and in response to determining that an error occurred during execution of the reissued system call, configure the one or more processors to disable tracing for the first thread and updating the thread data to indicate that tracing is disabled for the first thread that reissued the system call.

46. The non-transitory computer-readable medium of claim 45, wherein the instructions further cause the one or more processors to:

configure the one or more processors to enable tracing for the first thread while the one or more processors executes the first thread when the thread data for the first thread indicates that tracing is enabled for the first thread;

prior to configuring the one or more processors to disable tracing for the first thread in response to determining that the error during execution of the reissued system call, perform a context switch with a scheduler of the operating system so that the one or more processors executes the second thread instead of the first thread;

in performing the context switch, configure the one or more processors to disable tracing for the first thread;

after disabling tracing for the first thread, execute the second thread with the one or more processors; and when performing another context switch so that the one or more processors executes the first thread rather than the second thread, configure the one or more processors to re-enable tracing for the first thread.

47. A method comprising:

concurrently executing, with an operating system of a control unit included within a computing device, a plurality of processes, wherein each of the plurality of processes comprises an instance of one of a plurality of application programs, wherein each of the plurality of processes comprises one or more separate threads of instruction execution;

determining, with the operating system, that an error occurred when executing a system call issued by one of the one or more threads corresponding to one of the plurality of processes;

in response to the error, configuring, with the one of the threads that issued the system call, the operating system to enable tracing of the one of the threads that issued the system call without tracing any other threads corresponding to the one or any other one of the plurality of concurrently executed processes;

configuring, with the operating system, one or more registers of the control unit to enable tracing;

after configuring the one or more registers of the control unit to enable tracing, re-issuing the system call with the one of the one or more threads to the operating system; and tracing execution of the re-issued system call by the operating system with the control unit to generate a trace log that traces execution of the system call without tracing execution of any other system calls issued by any other ones of threads corresponding to the one or any other one of the plurality of concurrently executed processes.

48. The method of claim 47, further comprising:

determining, with the operating system, that a error occurred when executing the re-issued system call;

in response to the error that occurred when executing the re-issued system call, configuring, with the one of the threads that re-issued the system call, the operating system to disable tracing of the one of the threads that re-issued the system call;

configuring, with the operating system, one or more registers of the control unit to disable tracing.

* * * * *